US012579243B2

(12) United States Patent
Agrawal et al.

(10) Patent No.: US 12,579,243 B2
(45) Date of Patent: Mar. 17, 2026

(54) PROVIDING DYNAMIC AUTHENTICATION AND AUTHORIZATION AN ON ELECTRONIC DEVICE

(71) Applicant: MOTOROLA MOBILITY LLC, Wilmington, DE (US)

(72) Inventors: Amit Kumar Agrawal, Bangalore (IN); Bianca Boccato, Campinas (BR); Jose Guilherme Simao Prado, Campinas (BR); Letricia Pereira Avalhais, Jaguariuna (BR); Roberto Bresil, Campinas (BR)

(73) Assignee: Motorola Mobility LLC, Chicago, IL (US)

( * ) Notice: Subject to any disclaimer, the term of this patent is extended or adjusted under 35 U.S.C. 154(b) by 209 days.

(21) Appl. No.: 18/446,689

(22) Filed: Aug. 9, 2023

(65) Prior Publication Data

US 2025/0053626 A1    Feb. 13, 2025

(51) Int. Cl.
G06F 21/40        (2013.01)
G06F 21/32        (2013.01)

(52) U.S. Cl.
CPC .............. G06F 21/32 (2013.01); G06F 21/40 (2013.01)

(58) Field of Classification Search
CPC ................................ G06F 21/32; G06F 21/40
USPC .......................................................... 726/18
See application file for complete search history.

(56) References Cited

U.S. PATENT DOCUMENTS

| | | | | |
|---|---|---|---|---|
| 2002/0112177 | A1* | 8/2002 | Voltmer ................... | G07C 9/37 |
| | | | | 726/26 |
| 2007/0083604 | A1* | 4/2007 | Zimman ................. | G06F 21/32 |
| | | | | 709/207 |
| 2008/0172715 | A1* | 7/2008 | Geiger .................... | G06F 21/36 |
| | | | | 726/1 |
| 2011/0314558 | A1* | 12/2011 | Song ..................... | G06F 21/316 |
| | | | | 726/28 |

* cited by examiner

*Primary Examiner* — Michael S McNally
(74) *Attorney, Agent, or Firm* — Isidore PLLC

(57)        ABSTRACT

An electronic device, a method, and a computer program product provide authorization for a user to access functions and applications/application features of the electronic device while the device operates within a secure context and dynamically trigger second level authentication for the user to access secure device functions and applications/application features while the device is operating outside of a secure context. The method includes determining, by a controller of the device, whether the device is being operated in a secure context from among (i) operating within a trusted location and (ii) operating while communicatively connected to a trusted second device. The method includes, in response to determining that the device is not operating in the secure context, activating a second level authentication function that prevents automatic access and requires an additional level of user authentication for access to at least one of specific device operating functions and pre-selected applications/application features.

20 Claims, 9 Drawing Sheets

| Location | TRUSTED 2nd Device | Person | ACCESS Allow/Block |
|---|---|---|---|
| Y | Y | N/A | Allow |
| Y | N | Y | Allow |
| Y | N | N | Block |
| N | Y | Y | Allow |
| N | Y | N | Block |
| N | N | Y | Allow |
| N | N | N | Block |

*FIG. 7*

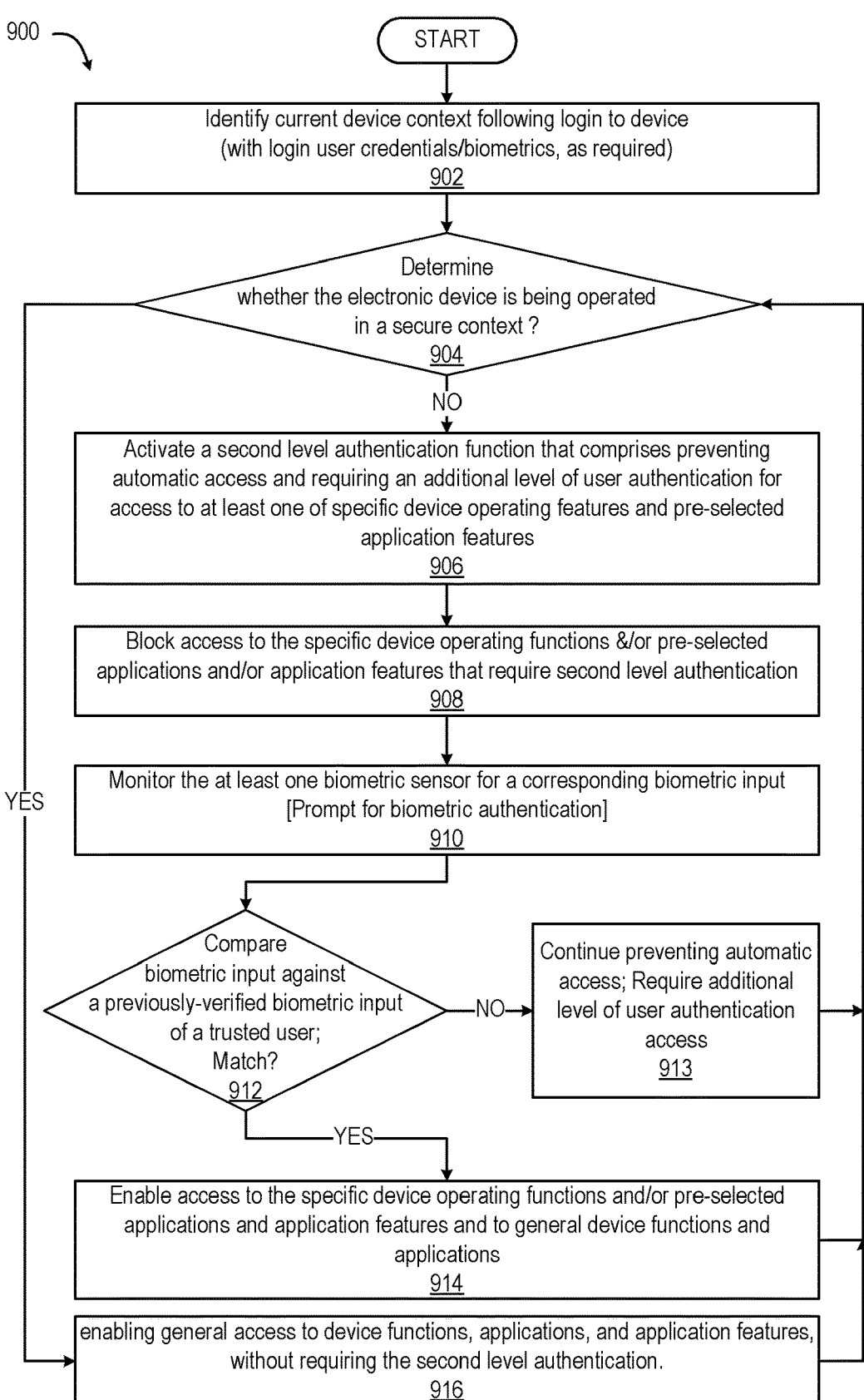

900

START

Identify current device context following login to device
(with login user credentials/biometrics, as required)
902

Determine
whether the electronic device is being operated
in a secure context ?
904

NO

Activate a second level authentication function that comprises preventing
automatic access and requiring an additional level of user authentication for
access to at least one of specific device operating features and pre-selected
application features
906

Block access to the specific device operating functions &/or pre-selected
applications and/or application features that require second level authentication
908

Monitor the at least one biometric sensor for a corresponding biometric input
[Prompt for biometric authentication]
910

YES

Compare
biometric input against
a previously-verified biometric input
of a trusted user;
Match?
912

NO

Continue preventing automatic
access; Require additional
level of user authentication
access
913

YES

Enable access to the specific device operating functions and/or pre-selected
applications and application features and to general device functions and
applications
914 enabling general access to device functions, applications, and application features,
without requiring the second level authentication.
916

FIG. 9

PROVIDING DYNAMIC AUTHENTICATION AND AUTHORIZATION AN ON ELECTRONIC DEVICE

BACKGROUND

1. Technical Field

The present disclosure generally relates to electronic devices, and more specifically to user authentication for authorized access to electronic devices and applications thereon.

2. Description of the Related Art

Modern portable electronic devices, such as smartphones, tablets, and laptop computers are designed with security features that enable authorized users to gain access to the devices. These security features typically include a lock screen that prevents access to operate most functions of the device until a user enters or provides a correct authentication input. These authentication inputs can include passwords, numeric or alphanumeric passcodes, and/or biometric inputs, such as fingerprints, facial image, or voice input. The devices will typically lock after a period of non-use or if locked or shut down, requiring the user to re-enter the authentication input to regain access to the device.

To avoid having a primary user continually having to re-enter their authentication input in situations where the device is in a known location, such as at the user's office or home, location based unlock features have been implemented on some devices, allowing the device to remain unlocked while physically located at the known location. This convenience for the primary user can unfortunately also enable an unauthorized user in the known location to access certain secure features on the device. Also, if the device is stolen or borrowed by a second user who has the device's lock screen password/passcode, that thief or second user can also access device settings and features, applications, and files on the device that the primary user may desire to keep secure.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 7 is a table showing an example of the different security contexts that the electronic device evaluates to determine whether to allow or block access to the device functions or secure applications and features, according to one or more embodiments;

FIG. 9 depicts a flowchart illustrating a method by which an electronic device activates and implements a second level authentication feature based on the device operating outside of a pre-defined secure context, according to one or more embodiments.

DETAILED DESCRIPTION

Figure 1:
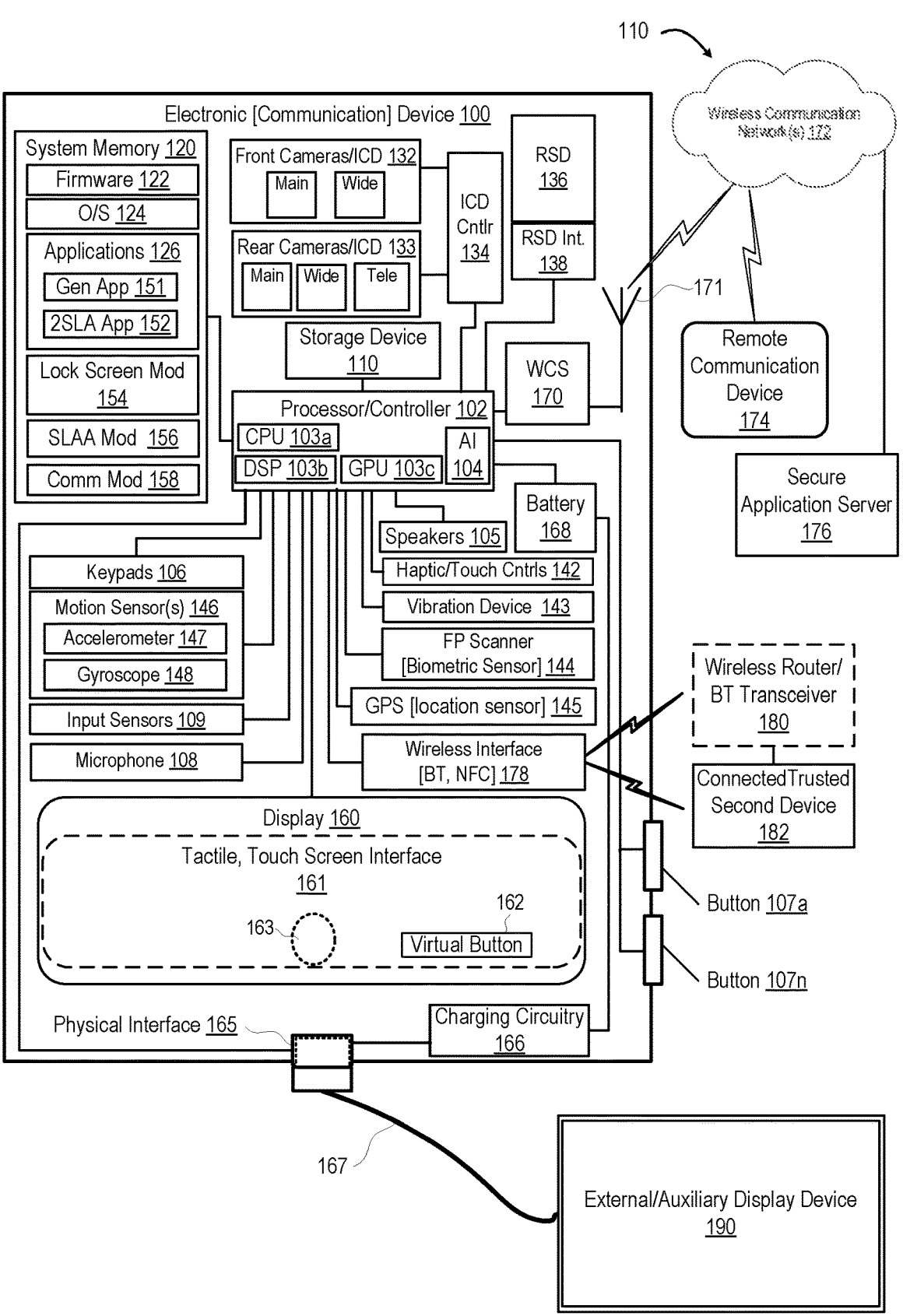
FIG. 1 depicts an example component makeup of an electronic device that is configured to autonomously trigger second level authentication when operating in a non-secure device context, and within which various other aspects of the disclosure can be implemented, according to one or more embodiments.

According to different aspects of the disclosure, an electronic device, a method, and a computer program product provide authorization for a user to access secure device functions and secure applications/application features of the electronic device while the device operates within a pre-established secure context and dynamically trigger a second level of authentication for the user to access secure device functions and application features while the device is operating outside of a secure context. The method includes determining, by a processor of the device, whether the device is being operated in a secure context from among (i) operating within a trusted location and (ii) operating while communicatively connected to a trusted second device. The method includes, in response to determining that the device is not operating in the secure context, activating a second level authentication function that prevents automatic access and requires an additional level of user authentication for access to at least one of specific device operating features and pre-selected application features.

Because portable electronic device can be accessed and used at different locations and by different people, there are several scenarios where dynamic user authentication and authorization could be desired, either/both at a device level and/or an application level. For example, a primary user, such as the mobile device owner, may not want a non-authorized (or second) user to have access to sensitive information that the device owner does not want to have exposed. However, the device owner may want to be able to avoid the additional authentication steps every time the device owner needs to access the device or unlock certain transactions. As an example, a primary user (owner) of the device may have the device stolen and would want to protect the non-authorized person from being able to execute transactions in or gain access to some applications, such as banking, social networking, e-mail, and features that may provide access to other kind of sensitive data. As another example, the primary user may be in a known location, such as at home or work; However, the primary user may want to prevent others to access the primary user's sensitive information/data while the device is unlocked and unattended within the known location. Also, in a specific example related to application levels of security, the primary user's device can be utilized to access an internet banking application. Login access to the application may require a pin/password to login and have access to basic information like account balance. The primary user may share the pin/password among family members but for prefer to require an extra level of authorization, such as by either requesting another pin/password or some kind of biometric data (face or fingerprint authentication) to complete specific transactions such as transferring money to another account. The disclosed embodiments provide the desired benefits of a second level security to be dynamically placed on the electronic device while operating in certain contexts, even for those secondary persons who have been provided or otherwise know the device's login credentials (e.g., password/pin) for general access to the device.

The descriptions herein contain simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

Each of the above and below described features and functions of the various different aspects, which are presented as operations performed by the processor of the electronic device and/or performed by the electronic device are also described as features and functions provided by a plurality of corresponding methods and computer program products, within the various different embodiments presented herein. In the embodiments presented as computer program products, the computer program product includes a non-transitory computer readable storage device having program instructions or code stored thereon, which enables the electronic device to complete the functionality of a respective one of the above-described processes when the program instructions or code are processed by at least one processor of the corresponding electronic device, such as is described above.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one implementation (embodiment) of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not for other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the numbered terms first, second, etc. do not denote any order or importance, but rather the terms first, second, etc. are used to distinguish one element (e.g., a person or a device) from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within electronic device 100 (FIG. 1) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Referring now to the figures, FIG. 1 depicts an example component makeup of an electronic device that is configured to autonomously trigger second level authentication when operating in a non-secure device context, and within which various other aspects of the disclosure can be implemented, according to one or more embodiments. Electronic device 100 is presented as a communication device, with specific components used to enable the device to provide wireless communication features, such as wireless calling, texting, and wireless server downloads and interfacing with applications that connect to backend server features or functions. Examples of electronic device 100 include, but are not limited to, mobile devices, a notebook computer, a mobile phone, a smart phone, a digital camera with enhanced processing capabilities, a smart watch, a tablet computer, and other types of electronic device that can be locked from access, such that user authentication is required to allow for access to the device and/or certain functions of the device and/or applications and/or specific application features.

Electronic device 100 includes processor 102 (typically as a part of a processor integrated circuit (IC) chip), which includes processor resources such as central processing unit (CPU) 103a, communication signal processing resources such as digital signal processor (DSP) 103b, and graphics processing unit (GPU) 103c. Processor 102 can, in some embodiments, include high quality camera image signal processors (ISPs) (not shown) and dedicated artificial intelligence (AI) engines 104. Collectively, processor 102 supports computing, classifying, processing, transmitting and receiving of data and information, presenting of graphical images within a display, and presenting of other forms of output via corresponding output devices. Processor 102 is communicatively coupled to storage device 110, system memory 120, input devices (introduced below), output devices, including integrated display 160, and image capture device (ICD) controller 134. According to one or more embodiments, ICD controller 134 performs or supports functions such as, but not limited to, selecting and activating an active camera from among multiple cameras and adjusting the camera settings and characteristics (e.g., shutter speed, f/stop, ISO exposure, zoom control, field of view (FOV) angle, etc.) of the active camera.

In one or more embodiments, the functionality of ICD controller 134 is incorporated within processor 102, eliminating the need for a separate ICD controller. Thus, for simplicity in describing the features presented herein, the various camera selection, activation, and configuration functions performed by the ICD controller 134 are described as being provided generally by processor 102. Similarly, manipulation of captured images and videos are typically performed by GPU 103c and certain aspects of device communication via wireless networks are performed by DSP 103b, with support from CPU 103a. However, for simplicity in describing the features of the disclosure, the functionality provided by one or more of CPU 103a, DSP 103b, GPU 103c, and ICD controller 134 are collectively described as being performed by processor 102, which can also be generally referred to as controller 102.

Throughout the disclosure, the term image capturing device (ICD) is utilized interchangeably to be synonymous with and/or refer to any one of front or rear facing cameras 132, 133. Front facing cameras 132 and rear facing cameras 133 are communicatively coupled to ICD controller 134, which is communicatively coupled to processor 102. Both sets of cameras 132, 133 include image sensors that can capture images that are within the field of view (FOV) of the respective ICD 132, 133. Electronic device 100 can include multiple cameras having different functionality, such as a main camera capturing standard view, wide angle camera that captures a wide angle FOV, and telephoto ICD, which captures a telephoto FOV (zoom or magnified). In one or more embodiments, a single camera can be provided with camera control options to change the single camera lens to allow for wide angle and telephoto image capture. In embodiments, one or more of the ICDs may be used for performing user biometric identification via facial recognition.

System memory 120 may be a combination of volatile and non-volatile memory, such as random-access memory (RAM) and read-only memory (ROM). System memory 120 can store program code or similar data associated with firmware 122, an operating system 124, and/or various applications 126. System memory 120 also includes a device lock screen security module 154, second level authentication and authorization (SLAA) module 156, and communication module 158. Each of lock screen security module 154, second level authentication and authorization (SLAA) module 156, and communication module 158 can be implemented as part of firmware, OS, or applications, in alternate embodiments. During device operation, processor 102 processes program code of the various applications, modules, OS, and firmware, that are stored in system memory 120 to perform and/or enable the electronic device to perform the general operations of the electronic device as well as the specific functions and operations described herein as aspects of the disclosure.

In accordance with one or more embodiments, applications 126 include, without limitation, a general purpose application 151 and a dual security level access (2SLA) application 152, such as a banking application. According to one or more embodiments, general access to the 2SLA application is provided via a user login credential and password/pin; However, specific features of the application are pre-configured to require a second level authentication when the device is being operated in a non-secured context, as described further herein. Lock screen security module 154 enables general access to the electronic device from the lock screen via user entry of a device login credential and password/pin, receipt of a biometric access input, such as a fingerprint, or detected entry and operation of the device within a pre-established secure location or device operation within commination range of a second user device, such as a wearable. According to aspects of the disclosure, second level authentication and authorization (SLAA) module 156 provides a second level or layer of security beyond the lock screen security module by requiring an additional entry of a second password or pin or receipt of a biometric input of a primary device user to allow access to certain device operations and/or certain application features whenever the device is not being operated within the secure context (i.e., within a known secure location or within communication range of a known, secure second electronic device).

Communication module 158 within system memory 120 enables electronic device 110 to communicate via wireless communication subsystem 170 and antenna 171 with wireless communication network 172, which enables communication with other devices, such as remote communication device 174 and secure application server 176, via one or more of audio, text, and video communications. Communication module 158 can support various communication sessions by electronic device 100, such as audio communication sessions, video communication sessions, text communication sessions, receiving notifications, exchange of data, and/or a combined audio/text/video/data communication session.

Each module and/or application provides program instructions/code that are processed by processor 102 to cause processor 102 and/or other components of electronic device 100 to perform specific operations, as described herein. Descriptive names assigned to these modules add no functionality and are provided solely to identify the underlying features performed by processing code of the different modules. For example, second level authentication and authorization module 156 can include program code to cause the electronic device to require a second, third, or fourth level authentication of the user, and so on, so that the module is not limited by the specific naming thereof.

In one or more embodiments, electronic device 100 includes removable storage device (RSD) 136, which is inserted into RSD interface 138 that is communicatively coupled via system interlink to processor 102. In one or more embodiments, RSD 136 is a non-transitory computer program product or computer readable storage device. RSD 136 may have a version of one or more of the applications and/or modules (e.g., 151, 152, 154, 156, 158) stored thereon. Processor 102 can access RSD 136 to provision electronic device 100 with program code that, when executed/processed by processor 102, the program code causes or configures processor 102 and/or generally electronic device 110, to provide the various second level authentication and authorization functions described herein. The RSD 136 can be an example of a non-transitory or tangible computer readable storage device.

To support voice communication and audio functions, electronic device 100 includes speakers 105. Electronic device 100 can further include several input devices, including physical (or virtual) keypads 106, microphone 108, and one or more input buttons 107a-107n. Microphone 108 is an audio input device that, in some embodiments, can be used as a biometric input mechanism for identifying a user via voiceprint, voice recognition, and/or other suitable techniques. Input buttons 107a-107n may provide controls for volume, power, and ICDs 132, 133. Additionally, electronic device 110 can include other input sensors 109 (e.g., enabling gesture detection by a user).

Electronic device 110 further includes haptic touch controls 142, vibration device 143, fingerprint scanner (or generally biometric sensor) 144, global positioning system (GPS) device 145, and motion sensor(s) 146. Vibration device 143 can cause electronic device 110 to vibrate or shake when activated, such as to notify the user of the need to provide a secondary level authentication. Vibration device 143 can be activated during an incoming call or message in order to provide an alert or notification to a user of electronic device 110.

Biometric sensor 144 can be used to read/receive biometric data, such as fingerprints, to identify or authenticate a user, and in some embodiments, the biometric sensor 144 can supplement an ICD (camera) for user detection/identification both during device lock screen login and second level authentication.

GPS device 145 can provide time data and location data about the physical location of electronic device 100 using geospatial input received from GPS satellites. It is appreciated that other forms of location sensors can also be used in alternate embodiments, including, for example, WiFi location sensing, etc. Motion sensor(s) 146 can include one or more accelerometers 147 and gyroscope 148. Motion sensor(s) 146 can detect movement of electronic device 100 and provide motion data to processor 102 indicating the spatial orientation and movement of electronic device 100. Accelerometers 147 measure linear acceleration of movement of electronic device 100 in multiple axes (X, Y and Z). Gyroscope 148 measures rotation or angular rotational velocity of electronic device 110. Electronic device 100 further includes a housing that contains/protects the components internal to electronic device 100.

Electronic device 100 includes an integrated display 160 which incorporates a tactile, touch screen interface 161 that can receive user tactile/touch input. As a touch screen device, integrated display 160 allows a user to provide input to or to control electronic device 100 by touching features within the user interface presented on display screen. Tactile, touch screen interface 161 can be utilized as an input device. The touch screen interface 161 can include one or more virtual buttons, indicated generally as 162. When presenting a lock screen or a screen requiring user entry of login credentials, touch screen interface also presents fingerprint sensor prompt 163 which is positioned above a fingerprint scanner (e.g., biometric sensor 144) located beneath the display 160. In one or more embodiments, when a user applies a finger on the touch screen interface 161 in the region demarked by the virtual button 162, the touch of the region causes the processor 102 to execute code to implement a function associated with the virtual button. In one or more embodiments, when a user applies a finger on touch screen interface 161 in the region demarked by the fingerprint sensor prompt 163, the fingerprint scanner (144) captures the image of the finger and the processor 102 compares the image to a stored fingerprint of the user as a part of the login authentication process for the electronic device 100. In some implementations, integrated display 160 is integrated into a front surface of electronic device 100, with front cameras, while the higher quality cameras are located on a rear surface.

Electronic device 110 also includes a physical interface 165a. Physical interface 165a of electronic device 110 can serve as a data port and a power port. As a power port, physical interface 165 is coupled to charging circuitry 166 and device battery 158 to enable recharging of device battery 168. Physical interface 165 can provide electrical access to external power supply (not shown) and/or a communication link to a second device, including an external display device 190. The physical access to electronic device 100 is provided via a cable 167 attached to physical interface 165a. It is appreciated that in alternate embodiments, both the connection to an external power supply or to a second device, such as an external display, can be provided via a wireless interface with the other devices. External display device 190 can be one of a wide variety of display screens, monitors, or devices, such as a liquid crystal display (LCD) and an organic light emitting diode (OLED) display. In one or more embodiments, external display device 190 can be a component of a second electronic device, such as a laptop or desktop computer, that includes separate processing functionality and network connectivity. In one or more embodiments, the external display device 190 can be used as a second or an auxiliary display device to mirror features presented on the display 160 of electronic device 110 and/or display notifications received for presenting to a user of the electronic device 110, and the external display device 190 can be selectively used instead of, or in addition to, the display 160 of the electronic device 100.

Electronic device 110 further includes wireless interface 178, which can be a short-range wireless communication component providing Bluetooth, near field communication (NFC), and/or wireless fidelity (Wi-Fi) connections. In one or more embodiments, electronic device 110 can communicate wirelessly with connected second device 182 via direct connection to the second device 182 via wireless interface 178 or via an intermediary external wireless transceiver device 180, such as a WiFi router or BT transceiver. According to one or more embodiments, the connected second device 182 can be a wearable device of the primary user of electronic device 100. However, the second connected device 182 can also be any specific second device that the primary user establishes during the SLAA module device configuration (FIG. 4A-4B) as a trusted second device whose connection to electronic device 100 indicates a secure context of the electronic device 100 to enable access to specific features and functions on/of electronic device 100. It is appreciated that for a trusted second device scenario, the secure context can be further defined as a range of distance from the electronic device 100 in which the second device 182 can maintain the short range (e.g., BT) connection with the electronic device 100.

Electronic device 110 further includes wireless communication subsystem (WCS) 170, which can represent one or more front end devices (not shown) that are each coupled to one or more antennas 171. In one or more embodiments, WCS 170 can include a communication module with one or more baseband processors or digital signal processors, one or more modems, and a radio frequency (RF) front end having one or more transmitters and one or more receivers. WCS 170 and antennas 171 allow electronic device 100 to operate as a communication device to communicate wirelessly with a wireless communication network 172 via transmissions of communication signals to and from network communication devices, such as base stations or cellular nodes, of wireless communication network 172. Wireless communication network 172 further allows electronic device 100 to wirelessly communicate with remote communication device 174, which can be similarly connected to wireless communication network 172. In one or more embodiments, wireless communication network 172 can be interconnected with a wide area network that can include one or more devices that support exchange of audio and video messages, data, and/or other communication between electronic device 110 and remote communication device 174.

Electronic device 100 can also communicate wirelessly with second devices and with wireless communication network 172 via communication signals transmitted by short range communication device(s) to and from an external WiFi/BT transceiver device 180, which can be communicatively connected to second device 182 and/or to wireless communication network 172. In one or more embodiments, electronic device 100 can receive Internet or Wi-Fi based calls via wireless interface 178. In an embodiment, WCS 170, antenna(s) 171, and wireless interface 178 collectively provide communication interface(s) of electronic device 100.

Figure 2:
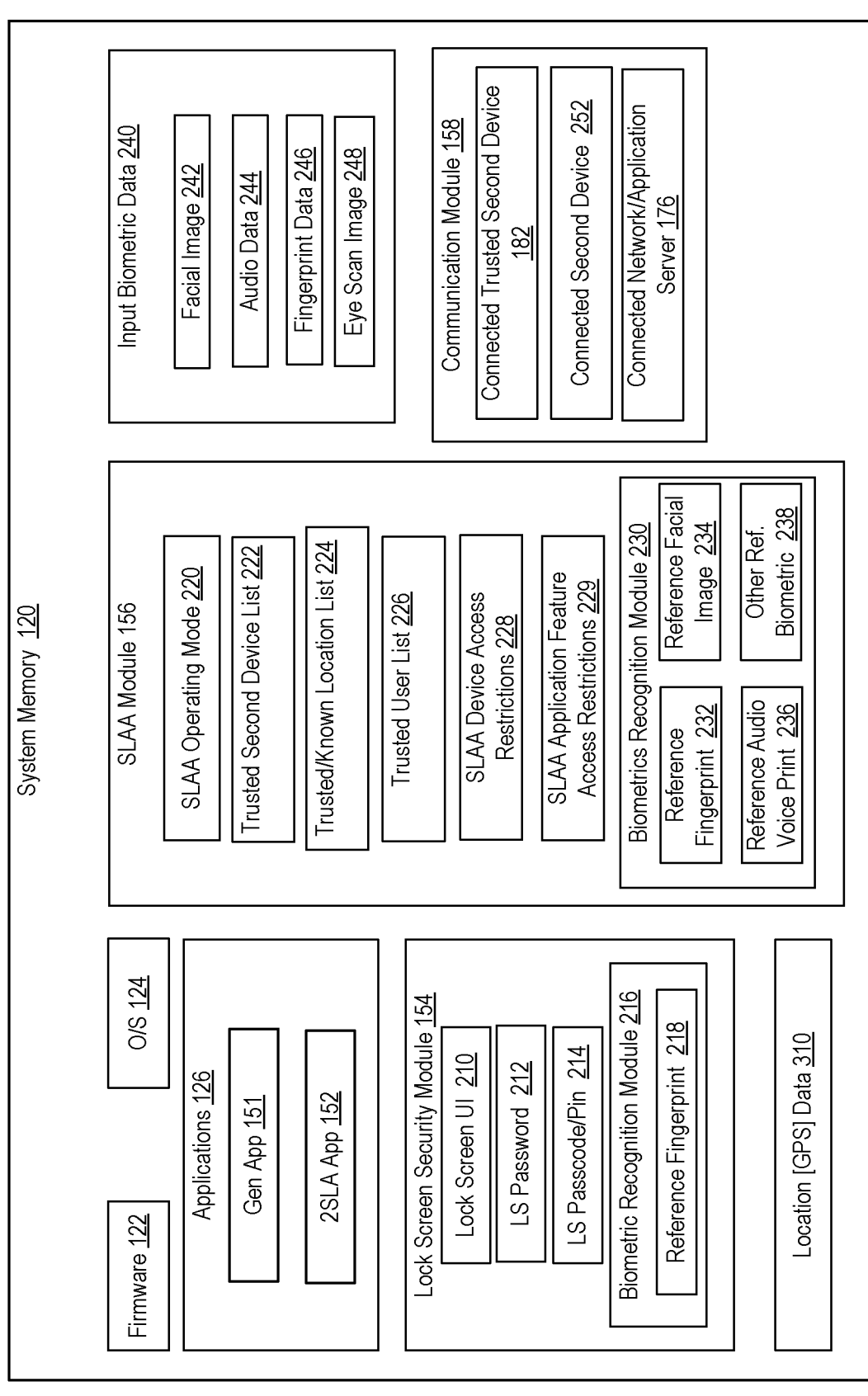
FIG. 2 is a block diagram illustrating example contents of the system memory of the electronic device of FIG. 1, according to one or more embodiments.

Referring now to FIG. 2, which presents a block diagram representation of example contents of the system memory 120 of the electronic device 100 of FIG. 1, according to one or more embodiments. System memory 120 includes data, software, and/or firmware modules, including the previously introduced firmware 122, operating system 124, applications 126, lock screen security module 154, SLAA module 156, and communication module 158.

Firmware 122 generally represents and/or includes all of the firmware required for operation of the various devices and components presented in FIG. 1. For example, firmware 122 includes code for the various biometric modules required for operation of the respective biometric sensors and firmware code for operation of the cameras, etc. Applications 126 can include a plurality of different applications, including general applications 151 that are accessible to any user with login access to the electronic device. Applications 126 can also include specific applications with additional security, i.e., dual security level access (2SLA) applications 152, such as an email application, a banking application, etc., that require an additional login authentication by the user before access to the application features are provided.

Lock screen (LS) security module 154 controls user access to the device by presenting a lock screen 210 with login credential prompts. LS Security module 154 includes preset login credentials including LS password 212, LS passcode or pin 214, and biometric recognition module 216, which includes a reference fingerprint 218.

SLAA module 156 includes instructions and data for completion of the various features described herein associated with second level authentication and authorization of a device user. SLAA module 156 includes SLAA operating mode instructions 220, trusted second device list 222, trusted/known location list 224, trusted user/person list 226, SLAA device access restrictions 228, and SLAA application feature access restrictions 229. FIGS. 3A-6B illustrate examples user interfaces by which several of the above data structures (e.g., lists) are specially identified and/or preselected by the primary user of the device when configuring the SLAA operating mode of the device. The description of these figures also provides additional detail explaining what each of these entries represent and how each is used during SLAA operations.

SLAA module 156 can also include (or can reference) biometrics recognition module 230, which performs the biometrics authentication process and/or supports the processor performing the biometrics authentication process by utilizing the stored reference biometrics data to compare against input biometrics data. Biometrics recognition module 230 can include reference fingerprint 232, which can be a different fingerprint than reference fingerprint 218 that is used for device login at the lock screen. Biometrics recognition module 230 can also include reference facial image 234, reference audio voice print 236, and other reference biometric data 238, such as an eye scan image. It is appreciated that the other reference biometric data 238 can include heart rate and other biometrics that can be determined by a device sensor.

Reference biometric data 232-238 within biometrics recognition module 230 are stored authenticated biometric data of a primary user associated with electronic device 100. A primary user is an individual associated with the electronic device that has previously registered or enrolled with the electronic device and has thus been authenticated to access all content of electronic device 100. Reference facial image 234 is a stored authenticated facial image of a primary user of electronic device 100. Reference audio data 236 is stored authenticated audio of the voice/speech of a primary user of electronic device 100. Reference fingerprint data 232 is stored authenticated fingerprint image of the fingerprint of a primary user of electronic device 100. In one or more embodiments, system memory 120 can also include reference second user biometric data which can be used to identify and/or authenticate a second user and trigger certain access privileges that may be more than an un-authenticated other user.

System memory also includes input biometric data 240, which can be one or more of facial image 242, voice print data 244, fingerprint data 246, and eye scan image 248. Input biometric data 240 can also include similar data as the other reference biometric data 238. Input biometric data 240 is received from at least one sensor of electronic device 100, such as microphone 108, cameras 132, 133, and fingerprint sensor 144. Facial image 352 can include a facial image of a current user of electronic device 100 that is captured by at least one of front or rear cameras 132, 133. Audio data 354 can include voice data corresponding to a current user of electronic device 100 that is captured by microphone 108. Fingerprint data 356 can include a fingerprint corresponding to a current user of electronic device 100 that is sensed by fingerprint scanner/sensor 144.

Communication module 158 enables electronic device 100 to communicate with wireless network 172 and with other devices, such as trusted second electronic device 182, via one or more of audio, text, and video communications. Communication module maintains a list of these second connected devices, which can include connected trusted second devices 182, connected second devices 252 that are not in the list of trusted second devices, and connection network/application servers 176, such as a bank server for a banking application.

SLAA module 156 includes program code that is executed by processor 102 to enable electronic device 100 to perform the various features of the present disclosure utilizing data within SLAA module and generally within memory 120. In one or more embodiments, execution of SLAA module 156 by processor 102 enables/configures electronic device 100 to perform the processes presented in the flowchart of FIGS. 8A-8B, as will be described below.

According to described aspects of the disclosure, and as illustrated by FIG. 1, an electronic device 100 is provided that includes: at least one network interface (170, 178) by which the electronic device communicatively connects via one or more networks to one or more second electronic devices 182; a location sensor (GPS sensor 145) that tracks a current location of the electronic device 100; and a memory 120 that includes a second level authentication and authorization (SLAA) module 156. The electronic device 100 further includes a controller (processor 102) communicatively coupled to the at least one network interface, the location sensor, and the memory. The controller 102 processes the second level authentication and authorization module 156 to enable the electronic device 100 to: determine whether the electronic device is being operated in a secure context from among (i) operating within a trusted location and (ii) operating while communicatively connected to a trusted second device (182); and in response to determining that the electronic device is not operating in the secure context, activate a second level authentication function that prevents automatic access and requires an additional level of user authentication for access to at least one of specific device operating features and pre-selected application features.

According to aspects of the disclosure, the electronic device 100 includes at least one biometric sensor (cameras 132/133, and scanner 144). In activating the second level authentication function, the controller 102 first blocks access to the specific device operating functions, applications, and/or pre-selected application features. The controller 102 then monitors the at least one biometric sensor for a corresponding biometric input, and compares the corresponding biometric input against a previously-verified biometric input of a trusted user. Then, in response to the corresponding biometric input matching the previously-verified biometric input of the trusted user, the processor removes the block and enables the verified user to access the specific device operating functions, applications, and/or pre-selected application features.

In one or more embodiments, the at least one biometric sensor includes at least one image capturing device, including a first image capturing device having a first field of view. The controller 102 autonomously captures an image of a user within the field of view of the first image capturing device, compares the captured image with a pre-stored image of the trusted user, and initiates the removal of the block and enabling access to the specific device operating features in response to the capture image substantially matching the pre-stored image.

In one or more embodiments, the electronic device includes a display 160, and the at least one biometric sensor includes a fingerprint scanner. The controller 102 generates and presents a prompt on the display 160 for the user to provide a fingerprint to self-authenticate the user. The controller 102 receives an image of the fingerprint presented on and captured by the fingerprint scanner, and the controller 102 compares the captured fingerprint image with a pre-stored fingerprint of the trusted user. The controller 102 initiates the removal of the block and enables access to the specific device operating features in response to the captured fingerprint image substantially matching the pre-stored fingerprint.

According to aspects of the disclosure, the controller, in response to determining that the electronic device is operating in a secure context, enables general access to device features and application features, following a sign-on authentication by a user of the electronic device to access operating features and applications on the electronic device, without requiring the second level authentication. The controller 102 continually monitors the current location of the electronic device and established communication links with trusted second devices. In response to determining that the electronic device is not in a trusted location and that there are no trusted second devices connected to the electronic device, the controller 102 blocks access to the specific device operating features and pre-selected application features that requires a second level authentication. When a user attempt to access the device operating features or pre-selected application features is later detected by the controller, the controller 102 monitors for receipt of biometric data from the user that matches stored biometric data of an authorized user and restores access to the specific device operating features and pre-selected application features in response to receipt of the matching biometric data. In one or more embodiments, the controller 102 generates and outputs a prompt for the user to enter the specific biometric data prior to monitoring for the biometric data. Alternatively, in one or more embodiments, the controller 102 can autonomously detect the biometric data (e.g., without prompting) by capturing a facial image using the device's camera or capturing a voice input/speech using the microphone of the device.

In one or more embodiments, to determine whether the electronic device is being operated in the secure context of being in a secure location, the controller 102 retrieves a first list of pre-identified secure locations, identifies, via the location sensor, the current location of the electronic device, and determines whether the current location is a location among the list of pre-identified secure locations.

In one or more embodiments, to determine whether the device is being operated in the secure context of being communicatively connected to a trusted second device, the controller 102 retrieves a second list of second devices that are pre-set trusted connected devices, identifies each second device that is communicatively connected to the electronic device, and determines whether the second device is included in the list of pre-set trusted connected devices.

In one or more embodiments, the at least one specific device operating functions/features includes accessing sensitive applications and operating functions on the electronic device. In one or more embodiments, the at least one pre-selected application features include accessing sensitive data within an application that also includes non-sensitive data. The controller 102 enables user selection of specific data to identify as sensitive data requiring second level authentication. The controller 102 provides access to the non-sensitive data by an authenticated user while the electronic device is within a trusted location or is connected to a trusted connected second device, and the controller 102 prevents access to the sensitive data by the authenticated user until the authenticated user completes the second level authentication via a biometric authentication.

According to one or more embodiments, the controller 102 determines whether the device is being operated in a secure context from among (i) operation within a trusted location and (ii) operation while connected to a trusted second device, in response to detecting initiation by the user of a transaction that is pre-identified as requiring the second level authentication.

Figures 3A, 3B, 3C:
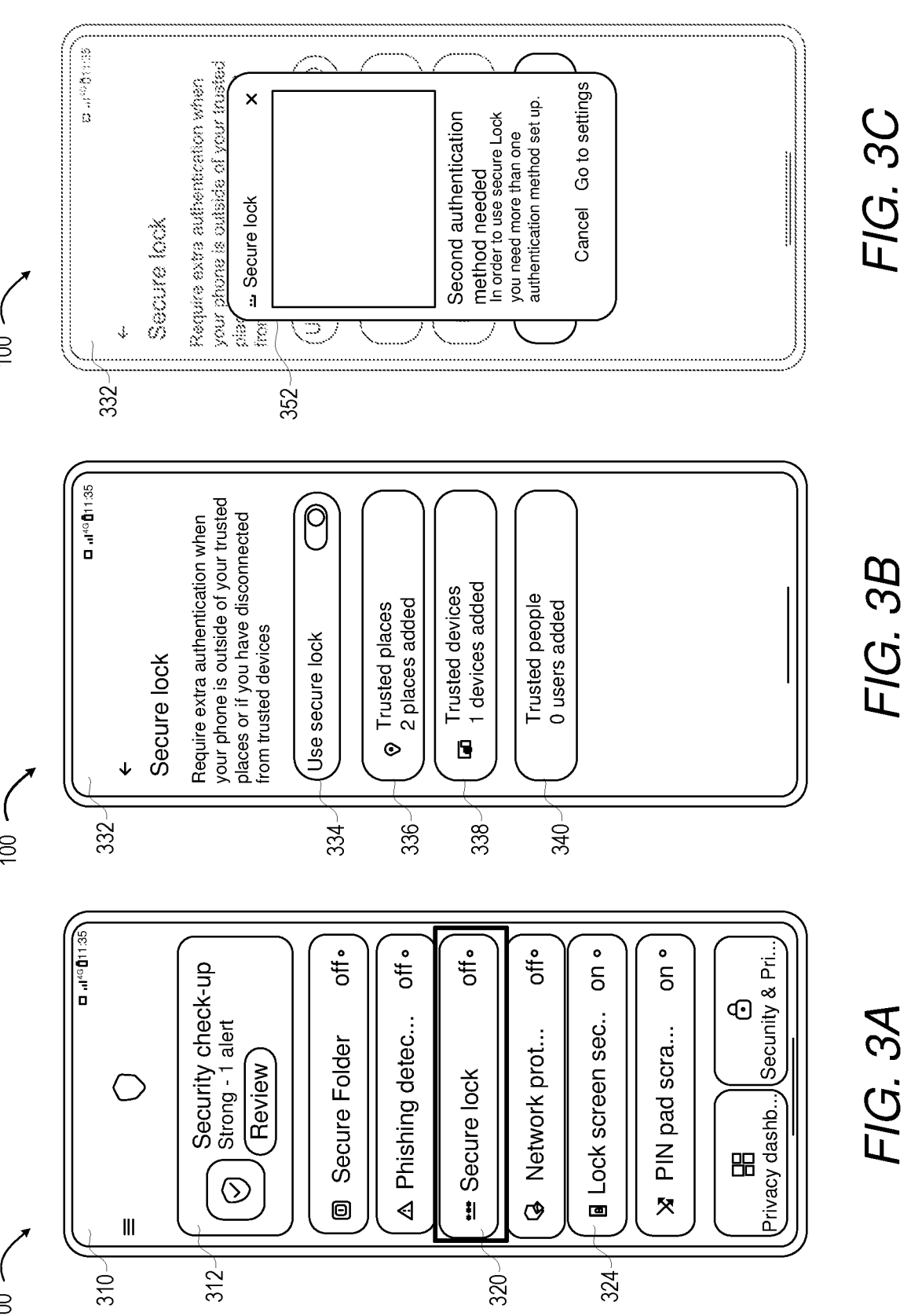
FIGS. 3A-3C are a series of diagrams illustrating example user interfaces on a display of the electronic device of FIG. 1 utilized to set up and configure aspects of a secure lock feature that triggers the second level authentication functions of the electronic device, according to one or more embodiments.

FIGS. 3A-3C are a series of diagrams illustrating example user interfaces on the display 160 of the electronic device of FIG. 1 utilized to set up and configure aspects of a secure lock feature, according to one or more embodiments. The setup of the secure lock features utilizing the secure lock option triggers the second level authentication functions of the electronic device. As shown by FIG. 3A, electronic device 100 includes a security settings page (or user interface) 310 that provides a notification 312 of security features for review by the device user. Within the listing of security settings are secure lock option 320, shown as set to "off" but highlighted to indicate selection by the user. Security settings also include lock screen security setting option 324, which is set to "on". This setting enables use of a lock screen to capture the login credentials of the user, which is the first level authentication for the device.

Selection by the device user of secure lock option opens a secure lock user interface 332, which presents use secure lock selectable option 334, shown with on/off slider button as toggled on. As shown by FIG. 3C, when the user toggles the user secure lock option button 334 to the "on" position, a pop-up notification window 352 is presented on the user interface 322, requesting a second authentication method be provided by the user. This requirement for the second authentication is provided in order to ensure that only the primary device user/owner has permission to change the secure lock settings, i.e., to prevent someone with the lock screen login credentials from changing the secure lock security settings of the device. The second authentication method can include a second password or biometric data, different from the lock screen credentials.

Also presented in secure lock user interface 322 are selectable option buttons, including trusted places button 336, trusted second devices button 338, and trusted people button 340. Selection of one or more of the buttons 336-340 enables the user to add specific ones of locations, second devices, and other users or user devices that are identified by the primary user as trusted for enabling access to secure features and functions of the electronic device 100.

Figure 4B:
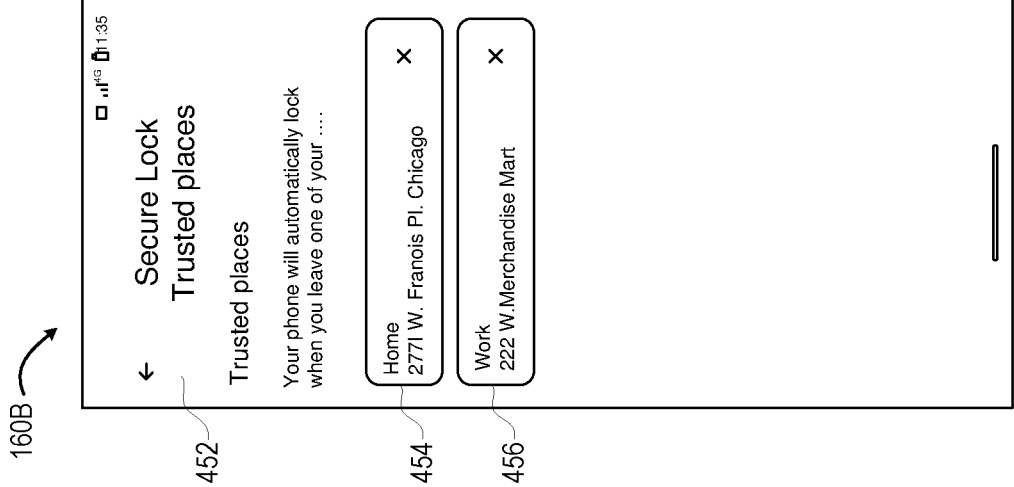
FIGS. 4A-4B illustrate example user interfaces on the display of the electronic device utilized to add and configure one or more trusted places for the second level authentication functions, according to one or more embodiments.
Figure 4A:
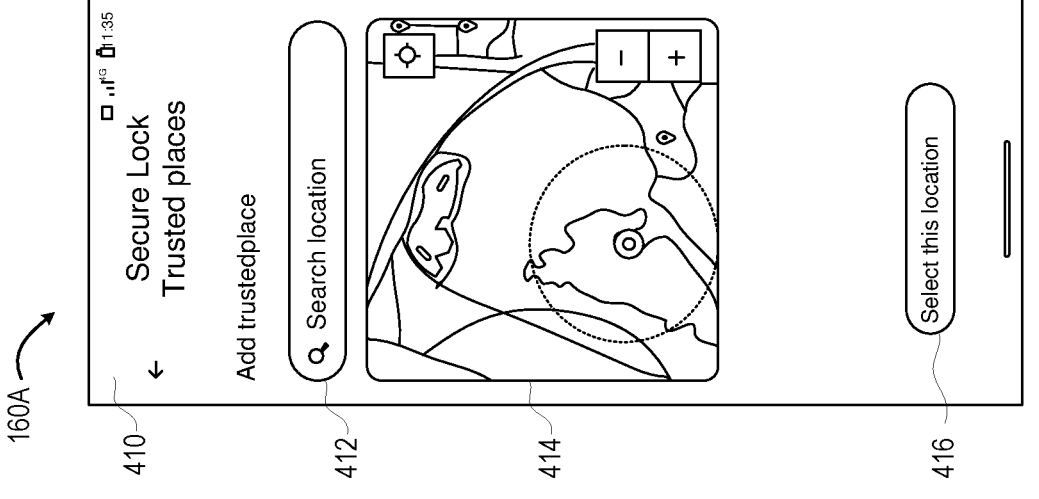

FIGS. 4A-4B illustrate example user interfaces on the display 160 (presented as different display representations 160A-160F) of the electronic device 100 utilized to add and configure one or more trusted places (or locations) for the second level authentication functions, according to one or more embodiments. Selection by the user of the trusted places button 336 (FIG. 3B) following completion by the user of the second authentication triggers the opening of the trusted places user interface 410 in FIG. 4A. Example trusted places user interface 410 includes search bar 412 for completing an address or named location search, a map 414 showing the location, which selectable buttons for navigating within and zooming in on the location, and a selection button 416 to confirm that the location is to be added to the trusted locations list. A geolocation circle indicates the specific location on the larger map that the user selects as the specific location for adding to the trusted locations. Once the user completes the selection of a location, the selected trusted locations are presented on a second user interface 452 (FIG. 4B). As shown, the two selected trusted locations of home 454 and work 456 are presented with the address of the respective locations. The geographic coordinates and/or addresses of these trusted locations are stored in the trusted locations lists 224 (FIG. 2) in the memory 120 of the electronic device 100.

Figure 5B:
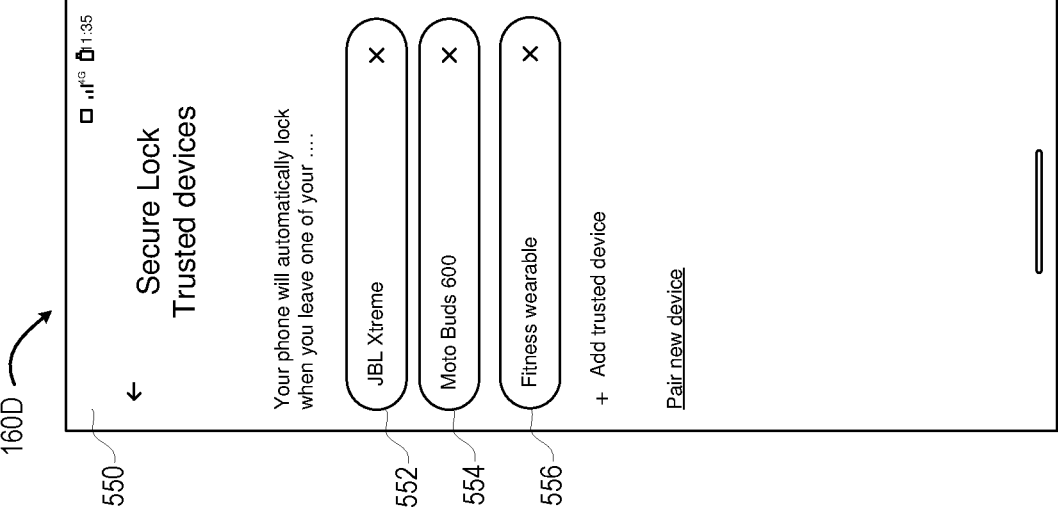
FIGS. 5A-5B illustrate example user interfaces on the display of the electronic device utilized to add and configure trusted second devices to which the electronic device can be communicatively connected for the second level authentication functions, according to one or more embodiments.
Figure 5A:
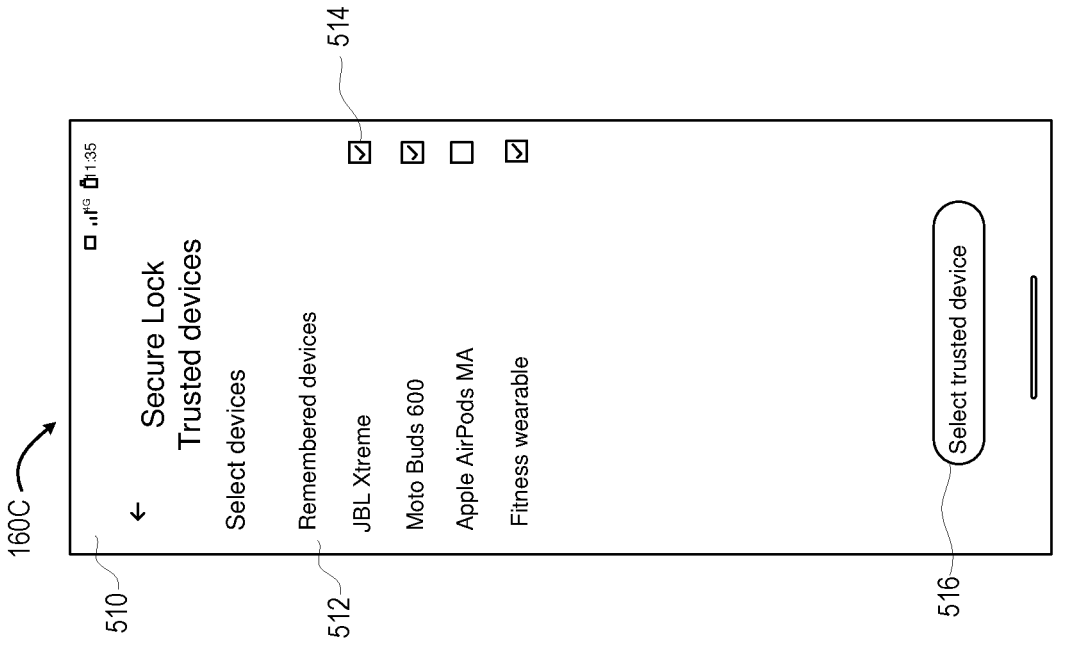

FIGS. 5A-5B illustrate example user interfaces on the display 160 of the electronic device 100 utilized to add and configure trusted second devices to which the electronic device can be communicatively connected for the second level authentication functions, according to one or more embodiments. Selection by the user of the trusted second devices button 338 (FIG. 3B), following completion by the user of the second authentication, triggers the opening of the trusted devices user interface 510 in FIG. 5A. Example trusted devices user interface 510 includes a list of remembered devices 512 that are or have been communicatively connected to electronic device. e.g., via Bluetooth or other near field communication. Besides each device is a check box 514 by which the user is able to select which of these devices should be identified as a trusted second device. Once the user completes the selection of the devices via the check box, selection of a select device option button 516 triggers the opening of second user interface 550 (FIG. 5B), which shows the selected trusted devices 552-556. An option is provided for adding other trusted devices, which can be completed by pairing the devices and then selecting the paired device within trusted devices user interface 510 (FIG. 5A). As shown, the three selected trusted devices, which includes external speakers and ear bugs are presented within second user interface 550. The identifiers of these trusted second devices are stored in the trusted second devices lists 222 (FIG. 2) in the memory 120 of the electronic device 100.

Figure 6B:
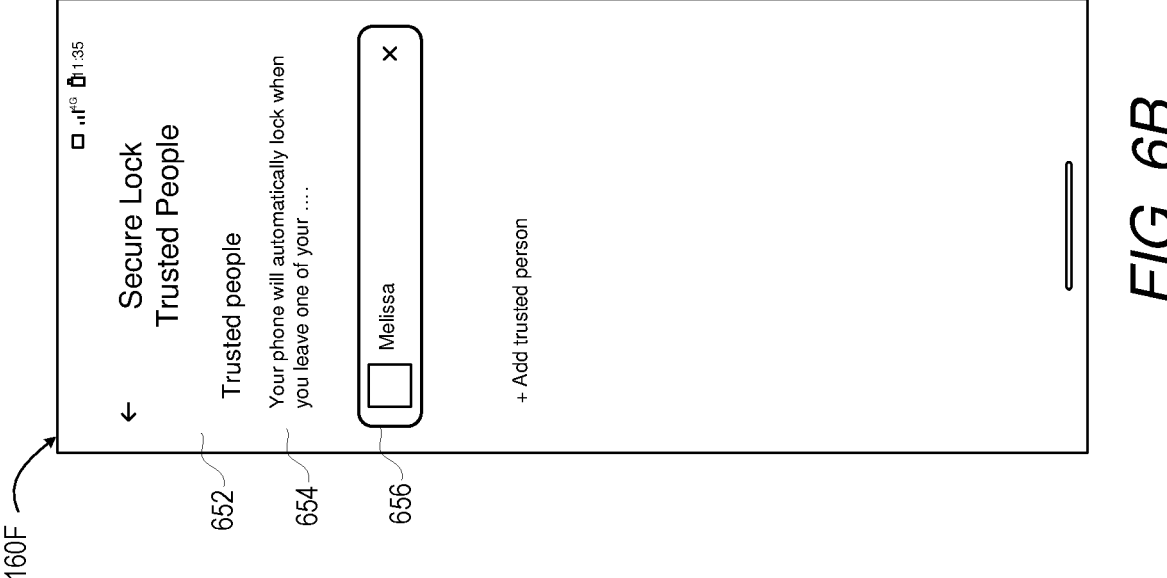
FIGS. 6A-6B illustrate example user interfaces on the display 160 of the electronic device 100 utilized to add and configure trusted users who may be provided access to electronic device by primary user, according to one or more embodiments.
Figure 6A:
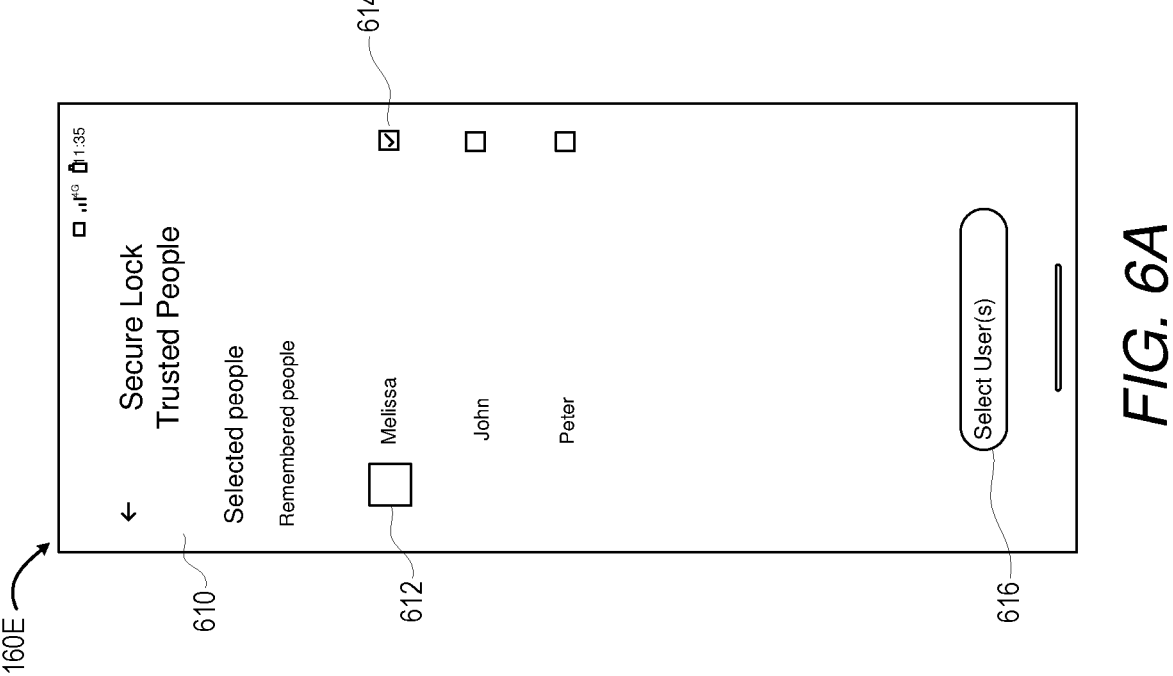

FIGS. 6A-6B illustrate example user interfaces on the display 160 of the electronic device 100 utilized to add and configure trusted users who may be provided access to electronic device by primary user, according to one or more embodiments. Selection by the user of the trusted people button 340 (FIG. 3B), following completion by the user of the second authentication, triggers the opening of the trusted people user interface 610 of FIG. 6A. Example trusted people user interface 610 includes a list of remembered people 612 that are or have been identified by the primary user as persons who can utilize electronic device, e.g., a child or spouse. Besides each person's name is a check box 614 by which the primary user is able to select which of the second users should be identified as a trusted second user who can access specific secure features or functions of/on the electronic device 100. Once the user completes the selection of the user(s) via the check box, selection of a select user(s) option button 616 triggers the opening of second user interface 652 (FIG. 6B), which shows the selected trusted people/users 656. A message 654 informs the primary user that the electronic device will automatically lock if left in an untrusted location and not connected to a trusted second device or being used by a trusted second person/user. An option is provided for adding other trusted users, which can be completed from an entry in the device contacts that includes an image or some other biometric information by which the second user can be authenticated, in one embodiment. As shown, the single trusted second user, Melissa, devices, which includes external speakers and ear bugs are presented within second user interface 550. The identifiers of these trusted persons are stored in the trusted persons list 226 (FIG. 2) in the memory 120 of the electronic device 100. It is appreciated that the primary user automatically falls into the trusted person list 226, so is not specifically provided for within the list 226.

FIG. 7 is a table showing an example of the different security contexts that the processor/controller 102 of the electronic device 100 evaluates when determining whether to allow or block access to one or more of specific device functions, secure applications/data, and/or secure application features, according to one or more embodiments. Table 700 includes three columns of data identifying whether the device is in a trusted location 702, communicatively coupled with a trusted second device 704, or being operated in the presence of a trusted person/user 706. Table 700 also includes an access grant/deny column 708 that indicates whether the access to the device and/or device functions and/or specific application features are allowed or blocked. Each row of the table shows the evaluation performed by the processor using the entries in the first three columns 702-706 to generate a resulting action indicated in the fourth access grant/deny column 708. As shown in the table, the processor allows access to the device functions and/or applications and application features whenever one of the three conditions are met from among (i) the device is in a trusted location, the device is in communication range of a trusted second device, or the device is being used by the primary user or a trusted second person. When none or these three conditions are true, the processor triggers the device to require a second level authentication of the user before allowing the user to access any of the protected features or functions of the device.

Figure 8B:
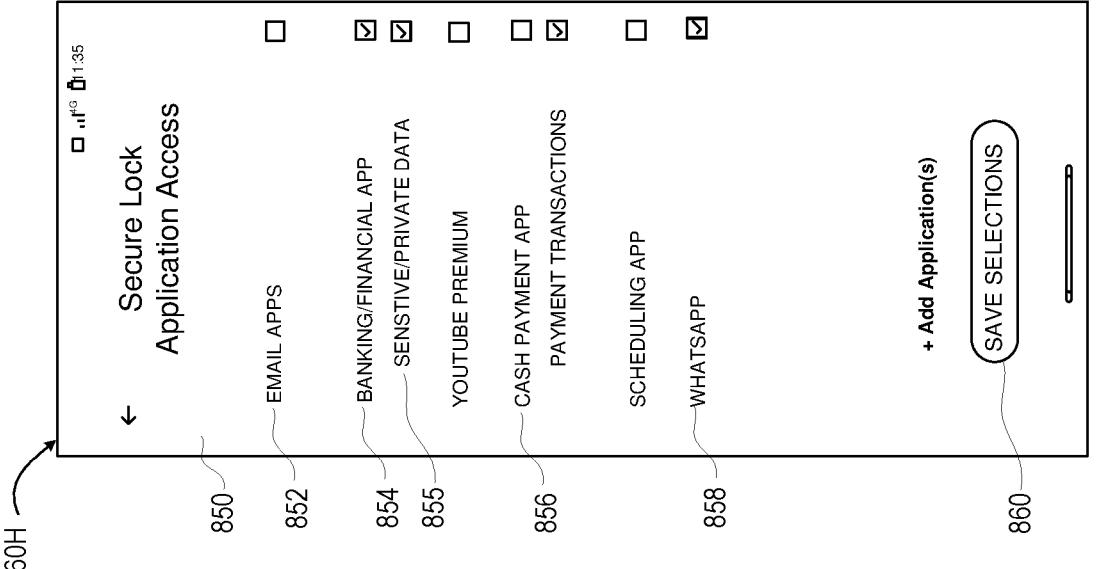
FIGS. 8A-8B illustrate example user interfaces for enabling a user selection of device features, applications and/or application features for which an attempt to access triggers a second level authentication for access thereto, according to one or more embodiments.
Figure 8A:
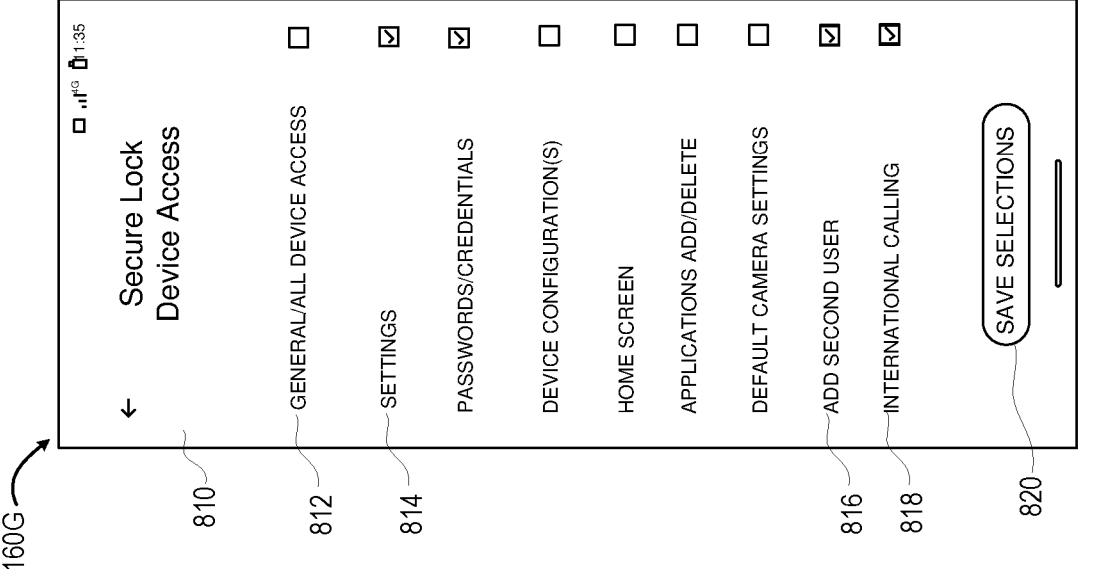

FIGS. 8A-8B illustrate example user interfaces for enabling a user selection of specific device features and applications and/or application features for which an attempt to access triggers a second level authentication for access thereto, according to one or more embodiments. FIGS. 8A-8B further presents a listing of the possible device functions and applications and application features that can be specifically identified as ones that require this second level authentication on a granular level. Secure lock device access user interface 810 and secure lock applications access user interface 850 are presented on representative displays 160G-160H. Referring to FIG. 8A, device access user interface 810 enables the authenticated primary user to select which specific device functions or operations to block when the device is being operated outside of a trusted location and out of range of a trusted second device by a user that is not a pre-identified trusted user. Device access user interface 810 is shown with selections for general/all device access 812, which effectively shuts down the device until the second level authentication is successfully completed. Other example possible selections presented within device access user interface 810 and shown as selected include settings 814, blocking access to the device settings feature, add second user 816, which prevents the additional of a second authorized user to the device, and international calling 818, which blocks use of the device for making phone calls outside the country in which the device is subscribed to a cellular service provider. Once the specific device access selections are made, the user can select the save selections button 820 to activate the second level security features for those specific device functions and features.

Similarly, with reference to FIG. 8B, applications access user interface 850 enables the authenticated primary user to select which specific applications and application (sub) features to block access to when the device is being operated outside of a trusted location and out of range of a trusted second device by a user that is not a pre-identified trusted user. Applications access user interface 850 is shown with selections for email applications 852, banking/financial application 854 as well as secondary access to sensitive/private data 855 within the banking/financial application that requires a biometric authentication of the user. Application access user interface 850 also has selected for requiring second level authentication payment transactions within cash payment app 856 and Whatsapp messaging app 858, as examples. Once the specific application access selections are made, the user can select the save selections button 860 to activate the second level security features for those specific applications and application features.

Referring now to the flowchart, FIG. 9 depicts a flowchart illustrating a method 900 by which an electronic device activates and implements a second level authentication feature based on the device operating outside of a predefined secure context, according to one or more embodiments. The description of method 900 depicted in FIG. 9 is provided with general reference to the specific components and/or features illustrated within the preceding FIGS. 1-8B and specifically FIGS. 1 and 2. Specific components referenced in the method described in FIG. 9 may be identical or similar to components of the same name used in describing preceding FIGS. 1-2. In one or more embodiments, processor/controller 102 (FIG. 1) configures electronic device 230 (FIG. 1) to provide the described functionality of method 900 by executing program code for one or more modules or applications provided within system memory 120 of electronic device 100. The method 900 begins at block 902 at which method 900 includes the processor identifying/monitoring the current device context following login by a user to the device. It is appreciated that the login would be a first level authentication that includes use of login credentials or user biometrics. Method 900 proceeds to decision block 904 at which method incudes determining, by the processor of the electronic device, whether the electronic device is being operated in a secure context from among (i) operating within a trusted location and (ii) operating while connected to a trusted second device. In one or more embodiments, a third context of the device being utilized by a trusted user is also evaluated by the processor. The trusted user can be a second user that has a different login access or authentication credential from the primary user, but has been identified by the primary user as a trusted person for accessing the electronic device. As a part of the determining, method 900 includes monitoring the current location of the electronic device and established communication links with trusted second devices.

In one or more embodiments, in determining whether the electronic device is being operated in the secure context of being in a secure location, the method 900 includes retrieving a first a list of pre-identified secure locations; identifying, via the location sensor, the current location of the electronic device; and determining whether the current location is a location among the list of pre-identified secure locations. In one or more embodiments, in determining whether the device is being operated in the secure context of being communicatively connected to a trusted second device, the method includes: retrieving a second list of second devices that are pre-set trusted connected devices; identifying each second device that is communicatively connected to the electronic device; and determining whether the second device is included in the list of pre-set trusted connected devices.

In response to determining that the electronic device is not operating in the secure context (e.g., in response to determining that the electronic device is not in a trusted location and that there are no trusted second devices connected to the electronic device), method 900 includes activating a second level authentication function that includes preventing automatic access to the device, specific device functions, specific applications and/or application features (block 906). The second level authentication function also includes requiring an additional level of user authentication for access to at least one of specific device operating features and pre-selected application features.

Method 900 further includes blocking access to the specific device operating functions and/or the specific pre-selected applications or application features that require a second level authentication (block 908). Method 900 includes monitoring the at least one biometric sensor for receipt of biometric data from the user that matches stored biometric data of an authorized user (block 910). In one or more embodiments, a prompt is presented on an output device (e.g., display, speaker) for the user to provide the required biometric authentication data or enter an additional second level authentication credential. Method 900 includes comparing the corresponding biometric input against stored biometric data from a previously-verified biometric input of a trusted user and determining, at block 912 if the biometric input is a match to the stored biometric data. If the biometric input is not a match, method 900 proceeds to block 913 which provides continuing to prevent/block automatic user access and require the additional level of user authentication for the at least one of specific device operating features and pre-selected application features. Method 900 returns to block 904. In an alternate embodiment, method 900 ends and a new login is required to the device by an authenticated user unless the device is determined to be in a secure context.

In response to the biometric input being a match, method 900 includes restoring access to the specific device operating functions and pre-selected applications and application features and enabling access to the general device functions and all applications and application features (block 914).

In one or more embodiments, the at least one biometric sensor includes at least one image capturing device, including a first image capturing device having a first field of view, and the method further includes: capturing an image of a user within the field of view of the first image capturing device; comparing the captured image with a pre-stored image of the trusted user; and initiating the enabling of user access to the specific device operating features in response to the capture image substantially matching the pre-stored image.

In one or more embodiments, the electronic device includes a display and the at least one biometric sensor includes a fingerprint scanner. Method 900 includes: generating and presenting a prompt on the display for the user to provide a fingerprint to self-authenticate the user; capturing an image of the fingerprint presented on the fingerprint scanner; comparing the captured fingerprint image with a pre-stored fingerprint of the trusted user; and initiating the enabling of user access to the specific device operating features in response to the captured fingerprint image substantially matching the pre-stored fingerprint.

Returning to block 904, when device is operating within the secure context, method 900 includes enabling general to the device functions and application features without requiring additional second level authentication (block 916). The general user access is provided following a sign-on authentication by the user of the electronic device to access operating features and applications on the electronic device. Method 900 then returns to block 904 to check that electronic device continues to operate in the secure context.

As can now be appreciated, disclosed embodiments improve the user experience regarding two factor authentication and device security in the event of theft of the device and/or unauthorized access to the electronic device functions or certain applications or application features on the electronic device when the device is outside of a trusted location and outside communication range of a second trusted device, such as a wearable device of the primary user/owner. By requiring a non-trusted user to provide a second level authentication in these scenarios, the primary user can maintain privacy and/or confidentiality to certain data accessible on, or by, the electronic device.

In the above-described methods, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals, but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. An electronic device comprising:

at least one network interface by which the electronic device communicatively connects via one or more networks to one or more second electronic devices;

a location sensor that tracks a current location of the electronic device;

a memory comprising a second level authentication and authorization (SLAA) module; and a controller communicatively coupled to the at least one network interface, the location sensor, and the memory, and which processes the second level authentication and authorization module to configured the processor to cause the electronic device to:

determine whether the electronic device is being operated in a secure context from among (i) operating within a trusted location and (ii) operating while communicatively connected to a trusted second device;

provide access to non-sensitive data by an authenticated user while the electronic device is within a trusted location or is connected to a trusted connected second device; and in response to determining that the electronic device is not operating in the secure context, activate a second level authentication function that prevents automatic access and requires an additional level of user authentication for access to at least one of specific device operating features and pre-selected application features, wherein the electronic device prevents access to sensitive data by the authenticated user until the authenticated user completes the second level authentication via a biometric authentication.

2. The electronic device of claim 1, further comprising:

at least one biometric sensor;

wherein in activating the second level authentication function, the controller:

blocks access to the specific device operating functions, applications, and/or pre-selected application features;

monitors the at least one biometric sensor for a corresponding biometric input;

compares the corresponding biometric input against a previously-verified biometric input of a trusted user; and in response to the corresponding biometric input matching the previously-verified biometric input of the trusted user, removes the block and enables the user to access the specific device operating functions, applications, and/or pre-selected application features.

3. The electronic device of claim 2, wherein:

the at least one biometric sensor comprises at least one image capturing device, including a first image capturing device having a field of view; and the controller:

captures an image of a user within the field of view of the first image capturing device;

compares the captured image with a pre-stored image of the trusted user; and initiates removal of the block and enables access to the specific device operating features in response to the capture image matching the pre-stored image.

4. The electronic device of claim 2, wherein:

the electronic device comprises a display;

the at least one biometric sensor comprises a fingerprint scanner; and the controller:

generates and presents a prompt on the display for the user to provide a fingerprint to self-authenticate the user;

captures an image of the fingerprint presented on the fingerprint scanner;

compares the captured fingerprint image with a pre-stored fingerprint of the trusted user; and initiates removal of the block and enables access to the specific device operating features in response to the captured fingerprint image matching the pre-stored fingerprint.

5. The electronic device of claim 1, wherein the controller:

in response to determining that the electronic device is operating in a secure context, enables general access to device features and application features, following a sign-on authentication by a user of the electronic device to access operating features and applications on the electronic device, without requiring second level authentication.

6. The electronic device of claim 5, wherein the at least one pre-selected application features comprises accessing sensitive data within an application that also includes the non-sensitive data, and the controller is configured to cause the electronic device to:

monitor the current location of the electronic device and established communication links with trusted second devices; and in response to determining that the electronic device is not in a trusted location and that there are no trusted second devices connected to the electronic device:

block access to the specific device operating features and pre-selected application features that requires a second level authentication;

enable user selection of specific data to identify as sensitive data requiring second level authentication via biometric authentication;

monitor for receipt of biometric data from the user that matches stored biometric data of an authorized user; and restore access to the specific device operating functions and pre-selected applications and application features in response to receipt of the matching biometric data.

7. The electronic device of claim 1, wherein:

to determine whether the electronic device is being operated in the secure context of being in a secure location, the controller:

retrieves a first list of pre-identified secure locations;

identifies, via the location sensor, the current location of the electronic device; and determines whether the current location is a location among the list of pre-identified secure locations; and to determine whether the device is being operated in the secure context of being communicatively connected to a trusted second device, the controller:

retrieves a second list of second devices that are pre-set trusted connected devices;

identifies each second device that is communicatively connected to the electronic device; and determines whether the second device is included in the list of pre-set trusted connected devices.

8. The electronic device of claim 1, wherein the at least one specific device operating features comprises accessing sensitive applications and operating functions on the electronic device.

9. The electronic device of claim 1, wherein;

the at least one pre-selected application features comprises accessing sensitive data within an application that also includes non-sensitive data; and the controller is configured to cause the electronic device to enable user selection of specific data to identify as sensitive data requiring second level authentication.

10. The electronic device of claim 1, wherein the controller determines whether the device is being operated in a secure context from among (i) operation within a trusted location and (ii) operation while connected to a trusted second device, in response to detecting initiation by the user of a transaction that is pre-identified as requiring second level authentication.

11. A method comprising:

determining, by a processor of an electronic device, whether the electronic device is being operated in a secure context from among (i) operating within a trusted location and (ii) operating while communicatively connected to a trusted second device;

providing access to non-sensitive data by an authenticated user while the electronic device is within a trusted location or is connected to a trusted connected second device; and in response to determining that the electronic device is not operating in the secure context, activating a second level authentication function that comprises preventing automatic access and requiring an additional level of user authentication for access to at least one of specific device operating features and pre-selected application features, wherein the preventing automatic access comprises preventing access to sensitive data by the authenticated user until the authenticated user completes the second level authentication via a biometric authentication.

12. The method of claim 11, wherein the electronic device comprises at least one biometric sensor and activating the second level authentication function comprises:

blocking access to the specific device operating functions, applications, and/or pre-selected application features;

monitoring the at least one biometric sensor for a corresponding biometric input;

comparing the corresponding biometric input against a previously-verified biometric input of a trusted user; and enabling the user to access the specific device operating functions, applications, and/or pre-selected application features, in response to the corresponding biometric input matching the previously-verified biometric input of the trusted user.

13. The method of claim 12, wherein:

the at least one biometric sensor comprises at least one image capturing device, including a first image capturing device having a field of view; and the method further comprises:

capturing an image of a user within the field of view of the first image capturing device;

comparing the captured image with a pre-stored image of the trusted user; and initiating the enabling of user access to the specific device operating features in response to the capture image matching the pre-stored image.

14. The method of claim 12, wherein:

the electronic device comprises a display;

the at least one biometric sensor comprises a fingerprint scanner; and the method further comprises:

generating and presenting a prompt on the display for the user to provide a fingerprint to self-authenticate the user;

capturing an image of the fingerprint presented on the fingerprint scanner;

comparing the captured fingerprint image with a pre-stored fingerprint of the trusted user; and initiating the enabling of user access to the specific device operating features in response to the captured fingerprint image matching the pre-stored fingerprint.

15. The method of claim 11, further comprising:

in response to determining that the electronic device is operating in a secure context, enabling general access to device features and application features, following a sign-on authentication by a user of the electronic device to access operating features and applications on the electronic device, without requiring second level authentication.

16. The method of claim 15, wherein the at least one pre-selected application features comprise accessing sensitive data within an application that also includes non-sensitive data, the method further comprising:

monitoring a current location of the electronic device and established communication links with trusted second devices; and in response to determining that the electronic device is not in a trusted location and that there are no trusted second devices connected to the electronic device:

blocking access to the specific device operating features and pre-selected application features that requires a second level authentication;

enabling user selection of specific data to identify as sensitive data requiring second level authentication via biometric authentication;

monitoring for receipt of biometric data from the user that matches stored biometric data of an authorized user; and restoring access to the specific device operating features and pre-selected application features in response to receipt of matching biometric data.

17. The method of claim 11, further comprising:

in determining whether the electronic device is being operated in the secure context of being in a secure location, the method comprises:

retrieving a first list of pre-identified secure locations;

identifying a current location of the electronic device; and determining whether the current location is a location among the list of pre-identified secure locations; and in determining whether the device is being operated in the secure context of being communicatively connected to a trusted second device, the method comprises:

retrieving a second list of second devices that are pre-set trusted connected devices;

identifying each second device that is communicatively connected to the electronic device; and determining whether the second device is included in the list of pre-set trusted connected devices.

18. A computer program product comprising:

a computer readable storage device; and program code on the computer readable storage device that when executed by a processor associated with an electronic device, the program code enables the electronic device to provide functionality comprising:

determining whether the electronic device is being operated in a secure context from among (i) operating within a trusted location and (ii) operating while communicatively connected to a trusted second device;

provide access to non-sensitive data by an authenticated user while the electronic device is within a trusted location or is connected to a trusted connected second device;

in response to determining that the electronic device is not operating in the secure context, activating a second level authentication function that comprises preventing automatic access and requiring an additional level of user authentication for access to at least one of specific device operating features and pre-selected application features, wherein the preventing automatic access comprises preventing access to sensitive data by the authenticated user until the authenticated user completes the second level authentication via a biometric authentication; and in response to determining that the electronic device is operating in a secure context, enabling general access to device features and application features, following a sign-on authentication by a user of the electronic device to access operating features and applications on the electronic device, without requiring the second level authentication.

19. The computer program product of claim 18, wherein the electronic device comprises at least one biometric sensor, the at least one pre-selected application features comprise accessing sensitive data within an application that also includes non-sensitive data, and the program code for activating the second level authentication function further enables the electronic device to provide functionality of:

blocking access to the specific device operating functions, applications, and/or pre-selected application features;

enabling user selection of specific data to identify as sensitive data requiring second level authentication via biometric authentication;

monitoring the at least one biometric sensor for a corresponding biometric input;

comparing the corresponding biometric input against a previously-verified biometric input of a trusted user; and enabling the user to access the specific device operating functions, applications, and/or pre-selected application features, in response to the corresponding biometric input matching the previously-verified biometric input of the trusted user.

20. The computer program product of claim 18, wherein the program code enables the electronic device to provide functionality of:

in determining whether the electronic device is being operated in the secure context of being in a secure location:

retrieving a first list of pre-identified secure locations;

identifying a current location of the electronic device; and determining whether the current location is a location among the list of pre-identified secure locations; and in determining whether the device is being operated in the secure context of being communicatively connected to a trusted second device:

retrieving a second list of second devices that are pre-set trusted connected devices;

identifying each second device that is communicatively connected to the electronic device; and determining whether the second device is included in the list of pre-set trusted connected devices.

\* \* \* \* \*